United States Patent [19]

Kim

[11] 3,872,063

[45] Mar. 18, 1975

[54] POLYMERIZATION PROCESS

[75] Inventor: Oh-Kil Kim, Springfield, Va.

[73] Assignee: American Cyanamid Company, Stamford, Conn.

[22] Filed: Aug. 29, 1972

[21] Appl. No.: 284,690

[52] U.S. Cl...... 260/80 C, 260/29.6 SQ, 260/80 M, 260/89.7 R, 260/79.3 M, 260/85.7, 260/85.50
[51] Int. Cl............................ C08f 1/70, C08f 1/74
[58] Field of Search .......... 260/80 M, 80 C, 89.7 R, 260/29.6 SQ

[56] References Cited
UNITED STATES PATENTS 3,767,629  10/1973  Vallino Jr., et al............ 260/89.7 R

FOREIGN PATENTS OR APPLICATIONS 556,265  4/1958  Canada............................ 260/80 C

*Primary Examiner*—Joseph L. Schofer
*Assistant Examiner*—H. J. Lilling
*Attorney, Agent, or Firm*—Harry H. Kline

[57] ABSTRACT

There is provided a novel method for effecting the polymerization of an inert, aqueous environment of acrylic acid, acrylamide, and similar vinyl monomers utilizing a novel catalyst system consisting of a bisulfite and a cyclic or acyclic polyhydric alcohol, such as cyclic monoanhydrosorbitol, mannitol, and long chain fatty acid esters thereof, such as the monostearic acid ester of the cyclic anhydrosorbitol, the monolauric acid ester of mannitol, or the corresponding oleyl esters thereof, in an aqueous environment at temperatures ranging from 0°C. to 100°C. to obtain high molecular weight of polymers ranging from 1 to 10 millions, or higher.

9 Claims, No Drawings

POLYMERIZATION PROCESS

The present invention relates to a process for the polymerization of water-soluble monomers. More particularly, it relates to the polymerization of water-soluble monomers utilizing a novel catalyst system consisting of a polyhydric alcohol or higher fatty acid ester thereof and a bisulfite mixture. Still more particularly, the invention is concerned with the polymerization of water-soluble acrylic acid, acrylamide, or similar vinyl monomers utilizing a novel catalyst system consisting of an aqueous polyhydric alcohol or higher fatty acid ester thereof and a bisulfite mixture.

It is known that water-soluble monomers, such as acrylamide or acrylic acid, can be polymerized to form serviceable polymers. Polymerization can be carried out by initially preparing an aqueous emulsion of the monomer and treating the latter with a free radical polymerization catalyst or activator. Such catalyst includes the use of alkali persulfates or hydrogen peroxide, either alone or in the presence of an alkali metabisulfite or sodium formaldehyde sulfoxylate. However, the use of such catalyst systems is not wholly satisfactory. This is because the presence of the persulfate can render the resultant polyacrylamide relatively storage-unstable. If a process could be devised which overcomes the deficiency of the prior practice, such would fill a long-felt need in the art.

It has been unexpectedly found that any $\alpha,\beta$-ethylenically unsaturated water-soluble monomer, such as acrylamide or acrylic acid, can be polymerized in a straightforward manner in the absence of alkali persulfates or peroxides rendering the resultant polymer relatively storage-stable. Water-soluble monomers are polymerized in an inert atmosphere utilizing a sorbitol or equivalent-bisulfite catalyst system. The polymerization may also take place subsequent to effecting emulsification of the monomer.

According to the process of the invention, a storage-stable, water-soluble polymer can be prepared utilizing an aqueous solution of a suitable water-soluble monomer in the presence of a sorbitol or equivalent-bisulfite polymerization catalyst and in the absence of persulfate or peroxide radicals. The reaction is carried out in an aqueous medium at a temperature from about 0°C. to about 100°C. in the absence of air or oxygen, whereby there is obtained a storage-stable, high molecular weight polymer. If desired, the reaction may be carried out in an aqueous emulsion. In that event, the sorbitol employed is preferably in the form of its higher fatty acid, so that the sorbitol ester is employed catalytically as the emulsifier.

In general, any $\alpha,\beta$-ethylenically unsaturated water-soluble compound, such as acrylic, methacrylic, or equivalent vinyl monomer, which undergoes a radical-initiated polymerization can be employed in the process of the invention. Exemplary of these compounds are: acrylamide, methacrylamide, acrylic acid, methacrylic acid, ethenesulfonic acid, the alkali metal salts of the latter sulfonated styrenes, as well as N-substituted acrylamide, such as N-methyl or ethyl acrylamide or methacrylamide.

Advantageously, the aforementioned monomers may be used alone or in admixture with one another or in admixture with other water-soluble monomers which when used alone cannot be polymerized with radical-forming agents, for example, maleic acid diamide or crotonic acid. The said water-soluble vinyl, acrylic, and methacrylic monomers according to the invention may also be copolymerized with monomers which are sparingly soluble in water, for example, vinyl esters, preferably esters of vinyl alcohol and saturated aliphatic monocarboxylic acids containing one to four carbon atoms; esters of acrylic acid or methacrylic acid and aliphatic saturated monohydric alcohols containing one to four carbon atoms; acrylonitrile or methacrylonitrile, in which case the monomers that are sparingly soluble in water are to be present only in quantities which are so small that the polymer which forms remains soluble in water at least at temperatures of up to 50°C. The concentration of the aqueous solution of the monomers is, in general, within the range of 20 percent to 80 percent, by weight, in cases in which liquid water-soluble monomers are used and within the range of 20 percent, by weight, to the concentration of saturation in cases in which solid water-soluble monomers are used.

In the event emulsion polymerization is to be effected, there may be employed a suitable solvent, such as, for instance, aliphatic and cycloaliphatic hydrocarbons, such as gasoline fractions boiling up to 100°C., hexane, and cyclohexane; aromatic hydrocarbons, such as benzene, toluene, and xylene; and esters, in particular, esters of saturated aliphatic monocarboxylic acids containing one to three carbon atoms. The said solvents may also be used in admixture with one another.

The proportion of quantities by weight of the aqueous monomer solution to the organic solvent in forming the emulsion medium is within the range of from 1:0.2 to 1:10 and, preferably, from 1:1 to 1:5.

Illustrative paired polymerization catalysts are: sorbitol-sodium bisulfite, sorbitol-potassium bisulfite, pentaerythritol-sodium sulfite, glycerol-potassium bisulfite, mannitol-potassium bisulfite, as well as sorbitol monostearate-sodium bisulfite, pentaerythritol laurylate-potassium bisulfite, and sorbitol trioleate-sodium bisulfite. The proportions of the polyhydric alcohol to alkali metal bisulfite polymerization catalysts added are from 1:1 to 1:3, respectively. They are used in quantities ranging from 0.001 percent to 5 percent, the percentages being calculated on the weight of the monomer or monomers present.

The reaction temperature is maintained over a wide range of temperatures, usually between 0°C. and 100°C., or even higher. It is preferably maintained between 30°C. and 70 °C. Polymerization is suitably conducted under an inert, gaseous atmosphere, such as nitrogen or argon, for from about 0.5 hour to 25 hours.

The product recovered is in the form of a gel in the event polymerization occurs in a water or aqueous environment. Alternatively, the product is a stable latex in the event the polymerization is conducted as an aqueous emulsion.

The following examples are presented for purposes of further clarifying the invention. These examples are by way of illustration and are not to be construed as being limitative of the invention. Unless otherwise stated, the parts and percentages are by weight.

EXAMPLE 1

To a suitable reactor equipped with stirrer, thermometer, reflux condenser, and connecting piece for introduction of nitrogen are added a 20 percent solids containing acrylamide prepared in xylene as a water-in-oil emulsion. The level of disperse phase is 40 percent. The vessel is sparged with nitrogen to remove oxygen. There are next added 10 grams of sorbitol monostearate as emulsifier and co-catalyst and 0.0015 gram of sodium sulfite as catalyst. Polymerization occurs with a mild exotherm to 32°C. at a pH equal to 4.7. Within two hours, there is obtained 88 percent conversion to a stable polyacrylamide latex of high molecular weight, namely, 6.7 millions.

The product is found to be an effective flocculant as evidenced by a high settling index of 213 is a standard test on a silica substrate.

Substituting acrylic acid for acrylamide in the above example, similar results are obtained and a high molecular weight polyacrylic acid results.

EXAMPLE 2

Employing the apparatus defined in Example 1 above, there are added 100 parts of an aqueous solution having a pH equal to 4.5 and comprising 12 parts of acrylamide. Nitrogen is bubbled in for 20 minutes to remove oxygen at room temperature, namely, 25°C. During polymerization, an oxygen-free atmosphere is maintained.

The reaction solution temperature is next raised to 32°C. and 0.2 part of sorbitol and 0.003 part of sodium bisulfite are added. The polymerization reaction is allowed to proceed at 32°C. to 34°C. for 15 hours. There is next obtained a stiff gel which is soluble and stable in water.

There is next recovered from the water a 95 percent yield of a gel-like product, based on the amount of monomer consumed, having a molecular weight of 5.1 millions.

EXAMPLE 3

A procedure similar to Example 1 is employed except that the acrylic acid neutralized to the extent of 67 percent with sodium hydroxide is substituted for acrylamide. The sorbitan monostearate is used as the emulsifier and a 15 percent acrylic acid overall concentration is employed with an aqueous phase/oil phase of 0.4 to 1 where xylene is the continuous (oil) phase. Again a mild exotherm occurs and a fine latex is formed with very little attendant exotherm.

EXAMPLE 4

The process of Example 1 is repeated in every respect except that 1 gram of sorbitan monostearate is employed. It is noted that larger particles of the order of 75 microns are obtained indicating essentially a suspension-polymerized polyacrylamide.

Substituting mannitol monooleate for sorbitan monostearate in this example, substantially the same results are attained.

I claim:

1. A process for effecting the aqueous polymerization of a polymerizable vinyl, acrylic or methacrylic monomer which consists in: polymerizing at temperatures ranging from 0°C. to 100°C. an aqueous solution of an $\alpha,\beta$-ethylenically unsaturated water soluble vinyl, acrylic or methacrylic monomer in the presence of a polymerization catalyst system consisting of a cyclic or an acyclic polyhydric alcohol and an alkali metal sulfite or an alkali bisulfite and in the absence of an oxygen or peroxide environment, and recovering resultant storage-stable, high molecular weight polymer.

2. The process according to claim 1 wherein the acrylic monomer is acrylamide.

3. The process according to claim 1 wherein the acrylic monomer is acrylic acid.

4. The process according to claim 1 wherein the molecular weight of the storage-stable polymer recovered ranges from 1 million to 10 million.

5. The process according to claim 1 wherein the aqueous medium is an aqueous emulsion.

6. The process according to claim 5 wherein the aqueous polymerization takes place in the presence of xylene.

7. The process according to claim 5 wherein the catalyst system is sorbitol monostearate-sodium bisulfite.

8. The process according to claim 5 wherein the catalyst system is sorbitan trioleate-sodium bisulfite.

9. The process according to claim 5 wherein the catalyst system is present as sorbitol monostearate-potassium bisulfite.

* * * * *